United States Patent
Nelson

[11] 3,842,632
[45] Oct. 22, 1974

[54] METHOD OF MANUFACTURE OF LIGHTWEIGHT, HIGH-SPEED DENTAL DRILL

[76] Inventor: Milton E. Nelson, 2302 Sandpiper Way, Pleasanton, Calif. 94566

[22] Filed: Mar. 28, 1973

[21] Appl. No.: 345,482

[52] U.S. Cl............... 72/70, 72/76, 72/341, 72/367, 32/48
[51] Int. Cl.............................. B21k 5/02
[58] Field of Search.......... 72/68, 70, 76, 341, 367; 32/48; 76/108 R

[56] References Cited
UNITED STATES PATENTS

| | | | |
|---|---|---|---|
| 418,710 | 1/1890 | Grah | 72/341 |
| 1,625,340 | 4/1927 | Thomas | 76/108 |
| 1,651,795 | 12/1927 | Wright | 76/108 |
| 2,227,817 | 1/1941 | Allen | 72/367 |
| 3,194,091 | 7/1965 | Woodward | 76/108 |
| 3,393,452 | 7/1968 | Nelson | 32/48 |

*Primary Examiner*—Lowell A. Larson
*Attorney, Agent, or Firm*—Warren, Rubin & Chickering

[57] ABSTRACT

A method of forming a lightweight, high-speed dental drill having integrally formed head and shank portions is disclosed. A piece of metal tubing is selected and the wall thickness thereof is reduced over the head portion of the drill. Thereafter the drill is swage formed to the desired external configuration, and the reduced wall thickness is the head portion insures that a bore of maximum dimension is maintained from the tubular shank portion to and through the drill head portion to the tip end. The hollow, very small diameter and high strength dental drill thus formed is employed advantageously in high-speed, air turbine dental handpieces. Reduction of the wall thickness of the head portion is accomplished by several types of forming steps, and swaging may additionally be employed to form the shank portion of the drill and before reducing the wall thickness of the head portion. Passageways are formed in the head portion to connect to the tubular bore in the head portion for aeration of the drill or flow of coolant therefrom.

7 Claims, 14 Drawing Figures

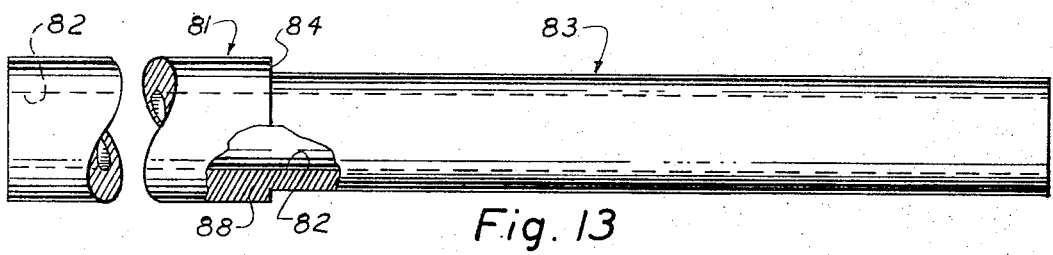
Fig. 13
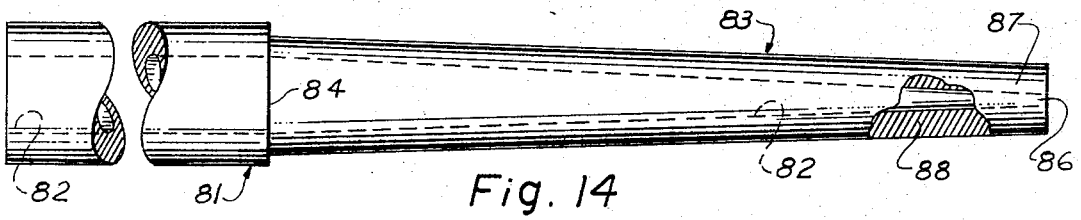
Fig. 14
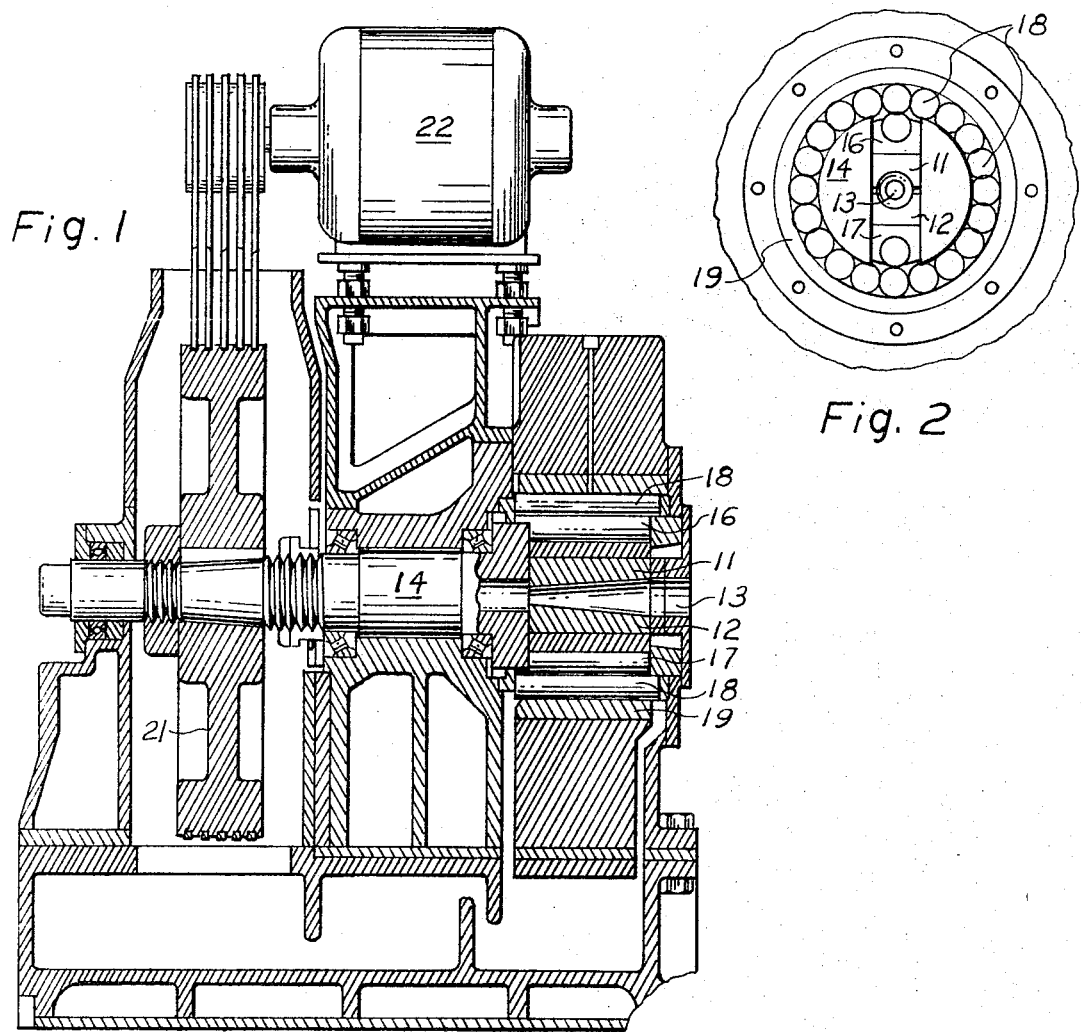
Fig. 1
Fig. 2

METHOD OF MANUFACTURE OF LIGHTWEIGHT, HIGH-SPEED DENTAL DRILL

BACKGROUND OF THE INVENTION

The current manufacture of dental drills by machining the drills out of solid stock leaves much to be desired. In recent years high-speed air turbine driven dental handpieces have been evolved capable of operating at speeds of about 250,000 rpm to about 500,000 rpm. With these higher rotating speeds, drill sizes tend to be smaller than in the case of the older style, slower turning drills. Under present dental practice, dental drills having an outside diameter more than 0.075 inches are rarely used. In fact most drills now have a diameter less than about 0.052 inches and needle type drills may have a diameter of 0.025 inches or less. It should be noted that larger drills, e.g., 0.0750 inches and above, have been displaced from the field because their mass slows drill rotation, but if they could be rotated at the high speeds of air turbine handpieces, the substantial advantages of the larger drills would return. Drills of all sizes have been formed in different shapes, some straight and others tapered, and it is further highly desirable to be able to form dental drills for the flow of fluid coolant therefrom or aeration of the tooth surface being worked upon.

When an air turbine handpiece is employed, lightweight drills are a necessity in order to achieve the full benefits of the air turbine handpiece. A heavy drill machined from solid stock will not achieve the same rotational velocity as a lightweight drill. Moreover, when the drill engages the tooth, it will be slowed down during its contact with the tooth. Solid stock drills having greater mass, will be less responsive in picking up speed once the drill is removed from contact with the tooth. Additionally, a lightweight drill retains its speed better during the contact with a tooth because of its lesser mass.

Moreover, air turbine dental handpieces have been evolved which are capable of transmitting water down the handpiece and to a tubular dental drill for emission from the working surface of the drill to cool and cleanse the tooth as drilling is taking place. Typical of such handpieces is the dental handpiece shown in my U.S. Pat. No. 3,136,059, issued June 9, 1964. This type of handpiece requires a tubualr dental drill with a longitudinal bore which extends into the drill head and preferably to adjacent the tip end of the drill for flow of coolant from openings extending along the head of the drill. Drills for use in handpieces such as above referred to may advantageously be formed with an overlapping pattern of openings for discharge of water as is set forth in my U.S. Pat. No. 3,393,452, issued July 23, 1968. While formation of dental drills of relatively large size for use in my dental handpiece with an overlapping hole pattern can be accomplished by conventional machining techniques, the problems involved in attempting to form a tubular drill having a perforated head portion with a diameter of 0.075 inches or less become quite substantial.

Machining drills to the above very small sizes is extremely difficult to do with the great precision required. As will be understood, very small imperfections in tolerance and in material will produce an imbalance at the high rotational speeds of air turbine handpieces which will lead to premature wear and failure of the drill. Inaccuracies in both the handpiece chuck and in the drills themselves combine to result unfavorably in the true running of the drills, which in turn throws a great strain on the very small cross-sections of material in the drill which must carry the load.

Accordingly, it is an object of the present invention to provide a method of manufacturing a dental drill which will allow a production of drills of very small size having improved strength.

Another object of the present invention is to provide a method of manufacturing a dental drill which enables elimination of useless mass to enable the drill to run at higher speeds, be more responsive in picking up speed, and to convey improved retention of speed during contact with the tooth.

Another object of the present invention is to provide a method of manufacture of a lightweight, high-speed dental drill which will enable fabrication of the drills to improved tolerances providing better balance and truer running drills.

Another object of the present invention is to provide a method of manufacturing a dental drill in which the lighter mass of the dental drill imposes less load on the drill section to reduce stress when the drill does not run perfectly true in the handpiece.

Another object of the present invention is to provide a method of manufacturing a dental drill which enables the formation of fine needle-type drills which are indispensible for crown and bridge dental work and yet are precisely formed for high-speed operation in an air turbine handpiece.

A further object of the present invention is to provide a method of manufacture of a dental drill which is suitable for use in mass production of dental drills at modest cost in a wide variety of shapes and sizes including flames, torpedos, tapers, cones, and others.

Still another object of the present invention is to provide a method of manufacturing a small diameter dental drill formed for aeration of the work surface operated upon and conduction of coolant to the work surface for improved cutting efficiency and comfort to the patient.

The method of manufacturing dental drills of the present invention possesses other objects and features of advantage, some of which will be set forth in the following description of the preferred embodiments of the present invention and which are illustrated in the drawings accompanying and forming part of this specification. It is to be understood, however, that variations in the showing made by the drawings and description may be adopted within the scope of the invention as set forth in the claims.

SUMMARY OF THE INVENTION

The method of manufacturing lightweight, high-speed dental drills of the present invention is comprised, briefly, of selecting a piece of metal tubing having a predetermined wall thickness and a length at least about equal to the overall length of the drill to be formed, reducing the wall thickness of the tubing adjacent a first end thereof, and thereafter swage forming the first end to define a head portion, with the wall thickness before swage forming being reduced to a thickness selected to maintain a bore in the head portion after swage forming. The drill is then preferably formed with a plurality of passageways which connect to the bore in the head portion, and the distal end of the head portion is closed. Reducing of the wall thickness in the head portion can be accomplished by machining the exterior or interior surfaces of the tubing. The method of the present invention may further include the steps of centerless grinding the tubing, swage forming the head portion before reducing its wall thickness, swage forming the shank, and forming a neck defining a line of demarcation between the head and the shank.

DESCRIPTION OF THE DRAWING

FIG. 1 is a cross-sectional view of a typical rotary swaging machine employed in the method of manufacturing dental drills of the present invention.

FIG. 2 is a fragmentary end view of the swaging machine of FIG. 1.

FIG. 13 is a longitudinal elevational view of a piece of tubing used to form a dental drill and constructed in accordance with an alternative method of manufacturing of the present invention.

FIG. 14 is a longitudinal elevational view of the dental drill of FIG. 12 in a further stage of formation.

DESCRIPTION OF THE PREFERRED EMBODIMENTS

Figure 3:
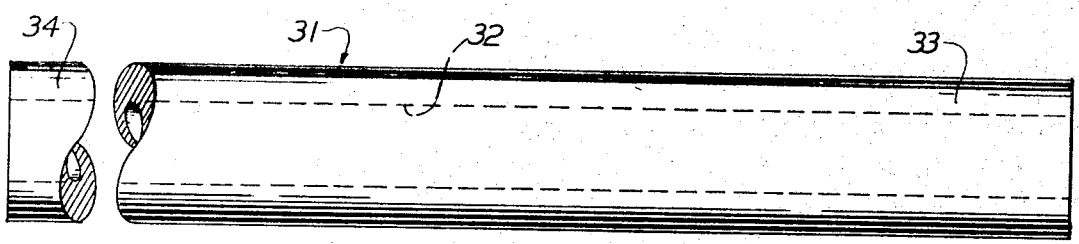
FIG. 3 is a longitudinal elevational view of a piece of tubing illustrating the first stage of formation of a dental drill in accordance with the method of the present invention.
Figure 4:
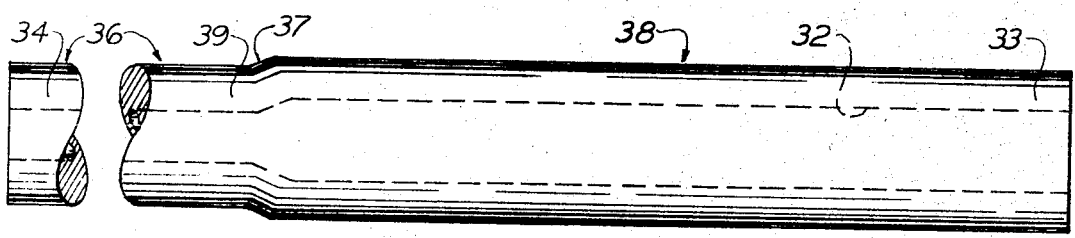
FIG. 4 is a longitudinal elevational view of the tubing of FIG. 3 in a further stage of formation.

The present invention involves the formation of a lightweight, high-speed dental drill out of tubular metal stock by reducing the wall thickness of a head portion of the dental drill and rotary swaging the head. The rotary swaging operation provides a work hardening and toughening of the metal at the small diameter head portion, which is the part normally subjected to high loading. The swaging operation is a precise forming operation which can be combined with a reduction of the wall thickness of the head to maintain an axial coolant passage in the drill.

Several rotary swaging machines are commercially available for use in fabricating the present drill. One is manufactured by The Torrington Company of Waterbury, Connecticut, another by Abbey-Etna Machine Company of Perrysburg, Ohio, and still another by the Fenn Manufacturing Company of Newington, Connecticut. A typical rotary swaging machine of this type, and of the type disclosed in U.S. Pat. No. 2,460,490, is shown in FIGS. 1 and 2 of the drawing. The machine is equipped with a pair of dies 11 and 12 which form the opposite sides of an axial cavity 13 conforming to the finished or an intermediate shape of the drill to be formed. These dies are mounted within a diametric cross-slot formed in the end of a rotating spindle 14 so that the dies are free to reciprocate to and from each other at the axis of rotation of the spindle. Also carried in the cross-slot are a pair of hammer blocks 16 and 17 which may similarly be reciprocated radially to and from the axis of rotation and against dies 11 and 12. Hammer blocks 16 and 17 are driven inwardly against the dies by contact at their outer surface with a series of peripherally spaced rollers 18. Rollers 18 are journaled for individual rotation in a stationary supporting cage 19. As a result, as spindle 14 is rotated, the work to be swage formed is carried or rotated around in the dies, and the dies are successively hammered toward the axis of rotation at a high rate to thereby form the part. Fly wheel 21 is conventionally mounted on spindle 14 to furnish inertia to the rotating assembly, and the fly wheel and spindle are driven by electric motor 22. Rotating speeds may be in the range of about 400 to about 700 rpm, which will effect a very rapid swaging of the work.

Referring now to FIGS. 3–7, various stages in the formation of a dental drill having an integrally formed head portion and shank portion are shown. In order to provide a lightweight dental drill through which coolant can pass, the first step in the method of the present invention is to select or employ a piece of metal tubing, generally designated 31, of predetermined wall thickness to define an internal bore 32. The tubing is selected to have a length at least about equal to the overall length of the drill to be formed, including the head and shank portions. The metal tubing best suited for use in the manufacturing process of the present invention is 304 stainless steel tubing, which is readily available through suppliers such as Superior Tube Company of Collegeville, Pennsylvania. It is also possible to use other stainless steels and to employ ordinary steels which may be plated with chrome. The drills must be able to be placed in a sterilizer and withstand corrosive environments. The 304 stainless can be hardened or in an annealed condition. If hardened, an annealing step prior to swage forming may be required when substantial reductions in tube diameter are attempted to avoid overworking of the tubing and cracking of the drills.

Tubing 31 may be somewhat shorter than the final drill to be formed since the swaging step of the method of the present invention involves some elongation of the tubing. Since the tubing can be readily trimmed at the shank portion to almost any desired length, however, it is often desirable to cut the tubing to a length longer than the dental drill for ease of manipulation. While drills come in various lengths and sizes, an overall final length of the drill including the shank and head portions of about 0.70 to 0.80 inches is a typical length. Since the tubing must be gripped during swage forming and during the deposit of diamond abrasive on the same it may be conveniently cut to about 1.750 inches for ease of handling.

The selection of the wall thickness of tubing 31 depends in part on the forming operations that will be employed to manufacture the drill. The final wall thickness of the shank and head portion of the drill must have sufficient strength to withstand rotational velocities in excess of 400,000 rpm. As will be seen in connection with some of the drills herein described, the shank portion of the drill may remain substantially the same wall thickness as the tubing. Thus, in those embodiments of the manufacturing method of the present invention, the tubing must be selected so that the shank portion will have a sufficient wall thickness to be gripped by the chuck of a handpiece and rotated at 400,000 rpm. As will be set forth more fully hereinafter, it is preferred that the wall thickness of the shank portion, when formed of a stainless steel in a standard 0.0625 diameter shank, be in the range of about 0.012 to about 0.018 inches to withstand the gripping force as well as the high rotational velocity. Obviously, thicker walls will suffice, but they add undesirable mass to the drill. Since the head portion of the drill is not gripped and is often, but not always, of smaller diameter than the shank portion, the wall thickness of the finished head portion is advantageously between about 0.005 to about 0.012 inches. It should be noted further that, while most handpieces are designed to grip a shank having a diameter of 0.0625 inches, there are miniaturized handpieces in which the nominal diameter of the shank is 0.0425 inches. The reduction in diameter of the shank in these handpieces is another illustration of an attempt at higher speed through smaller diameter.

The method of the present invention is used in FIGS. 3–7 to form a dental drill having a head portion on a first end 33 which is larger in diameter than the shank portion formed on second end 34 of tubing 31. Thus, while not required in the method of the present invention for the manufacture of all drills, the next step in the manufacture of the drill of FIGS. 3–7 (known as a "torpedo" dental drill) is swage forming second end 34 of tubing 31 to reduce the outside diameter thereof over a length of second end 34 and define a shank portion 36. Instead of being constantly tapered as shown in FIG. 1, dies 11 and 12 for the swage forming of shank portion 36 are substantially cylindrical with a tapered open end portion which forms shoulder 37 initially defining the boundary between shank portion 36 and a head portion 38 of the drill.

Swage forming of shank portion 36 reduces the shank to a diameter suitable for gripping by the chuck of a dental handpiece. Additionally and more importantly, wall 39 of the shank has its thickness increased, and the wall is work hardened by the swaging step. Thus, the strength of the shank portion has been substantially increased to enable clamping by the chuck and high-speed rotation while the head portion is subjected to a transverse load upon contact with a tooth. In a typical relatively large diameter torpedo type dental drill, tubing 31 will be selected to have an outside diameter of about 0.075 inches and will be reduced during the swaging of second end 34 to have a shank portion 36 with an outside diameter of about 0.065 inches. The shank will subsequently be centerless ground to 0.0625, and bore 32 is initially about 0.040 inches.

Figure 5:
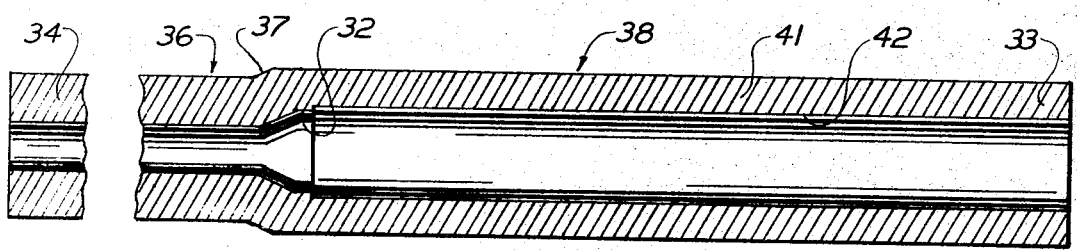
FIG. 5 is a longitudinal elevational view, in cross-section, of the tubing of FIG. 3 in still a further stage of formation.

In order to maximize the diameter of bore 32 in head portion 38 while forming the desired external configuration, the next step in the process of the present invention is to reduce the wall thickness 41 of the tubing adjacent first end 33, and preferably substantially over the length of head portion 38. As shown in FIG. 5, the reducing step of wall portion 41 has been accomplished by machining a portion of the tubing from the interior surface thereof to provide a bore 42 of increased diameter over that of bore 32. This reduction in wall thickness of the head portion can be accomplished readily by counterboring bore 32 from end 33 of the tubing. It is preferable to terminate counterboring short of shoulder 37 so as to avoid weakening of the drill at shoulder 37. As will be set forth more fully in connection with the drill of FIGS. 13 and 14, the reducing step can also be accomplished by machining a portion off the exterior surface of the tubing to reduce the outside diameter thereof. Wall thickness 41 will typically be reduced an amount equal to about 0.003 to about 0.006 inches during the formation of a torpedo type dental drill with a maximum head diameter of 0.075 inches.

In order to increase the strength of head portion 38 and provide the desired external configuration on the head portion, the next step in the method of the present invention is swage forming end 33 of the tubing to define a head portion of substantially the desired external configuration.

Figure 6:
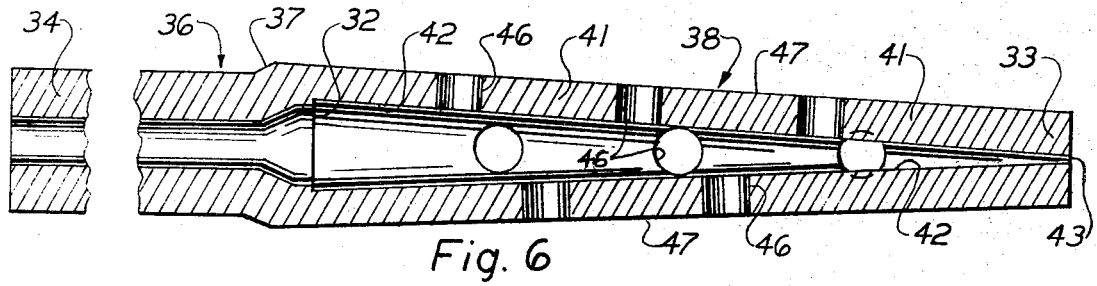
FIG. 6 is a longitudinal elevational view, in cross-section, of the tubing of FIG. 3 in still a further stage of formation.

While swage forming of small diameter tubing has been previously accomplished, for example, in connection with hypodermic needles as shown in U.S. Pat. No. 2,058,556, such needles are never subjected to any significant static or dynamic strain. Accordingly, little need arises for any great concern as to the uniformity of the swaged piece or the strength or thickness of the walls. By contrast, in a dental drill failure of the drill at the extreme velocities at which it travels could be extremely serious. Frustoconical dies 11 and 12 are employed in the rotary swaging machine of FIG. 1 to produce the tapered configuration of head portion 38 as shown in FIG. 6. The swage forming operation causes wall 41 of the head to thicken increasingly from shoulder 37 to tip end 33, where the greatest amount of deformation occurs. The wall thickness before swaging, however, was reduced during the reducing step so that the swage forming maximizes the size of bore 42 from the shank to a position immediately adjacent tip end 33 of the head. Swage forming the head portion causes a work hardening as well as a thickening, both of which combine to increase the strength of wall 41 over the length of the head.

While it may be desirable in certain instances not to close the tip end 33 of the drill and therefore to allow bore 42 to continue to an opening 43 at the end of the drill, it is often highly desirable to form a closure 44 at tip end 33 of the head to terminate tubular bore 42. In the field of crown and bridge work the removal of substantial amounts of outer enamel from the tooth must be accomplished, and the tip end of the drill can be advantageously employed to a large degree. Similarly, in operative dentistry the tip end of a drill is frequently and advantageously employed. Open ended drills, therefore, often have the substantial disadvantage of not providing a sufficient surface area for affixation of enough diamond particles to provide a working surface on the end of the drill of any significance. Thus, formation of end closure 44 is optional, but it is a preferred step in the process of the present invention to provide a working surface on the end of the dental drill. Formation of the end closure can be accomplished as a separate step (preferably swage forming for uniformity) or simultaneously with the formation of the tapered section of head portion 38.

Figure 7:
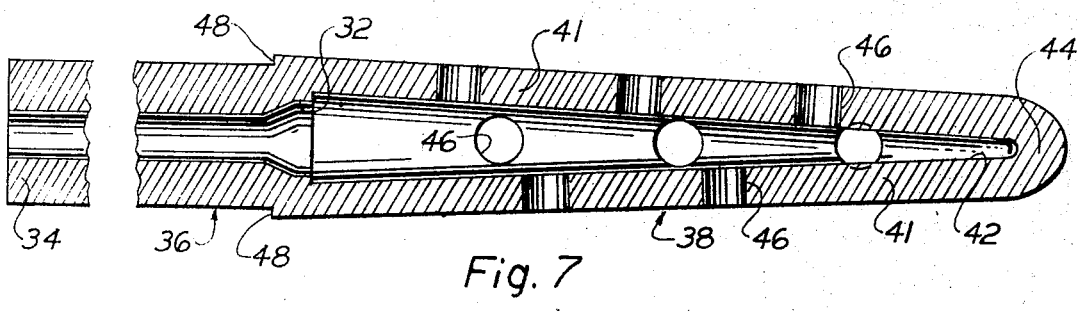
FIG. 7 is a longitudinal elevational view, in cross-section, of a dental drill formed from the tubing of FIG. 3 and in its final form.

In order to aeroate the dental drill or enable coolant to be passed therethrough, and to reduce the mass of the drill further, at least one, and preferably a plurality of passageways 46 are formed in head portion 38 to extend between bore 42 and terminate in openings in the exterior surface 47 of the drill. Passageways 46 may be formed by a drilling operation and preferably have an overlapping pattern as is more fully set forth in my U.S. Pat. No. 3,393,452. Since drilling of passageways 46 may result in certain chips being deposited in bore 42, and burrs formed adjacent the passageways, it is preferable not to close opening 43 in the tip end of the dental tool until the passageways are deburred and the debris from the drilling step can be removed from bore 42, usually through the opening in the shank. The final steps in formation of the torpedo dental drill are shown in FIG. 7 and include forming end closure 44 and forming a neck or shoulder 48 defining a line of demarcation between head portion 38 and shank 36. The neck 48 is preferably formed at tapered shoulder 37, and the diamond abrasive is affixed to head 38 up to neck 48. Additionally, shank portion 36 may be advantageously centerless ground to reduce its external diameter by about 0.002 inches to enhance the symmetry and dynamic balance of the drill. Finally, the drill is cut to a predetermined length, usually by cutting shank portion 36 at end 34 to reach the desired overall length for handling of the drill during affixation of the diamond abrasive, after which the drill is cut at the shank to its final length of about 0.750 inches.

The finished drill of FIG. 7 will have an overall maximum diameter of about 0.075 inches at neck 48 and a head length of 0.325, and yet the drill will be hollow from its shank portion to the end closure. Rotary swage forming will have precisely formed and work hardened the walls of the head and shank while maintaining a maximum axial bore in the drill. A drill having this relatively large diameter and head length can once again be advantageously used in a standard air turbine handpiece, since its light weight will allow it to reach and maintain the high speeds of small diameter drills. The relatively large diameter of the drill will prevent the ridging effect created by small diameter drills. Additionally, passageways 46 will allow air turbine handpieces of the type set forth in my U.S. Pat. No. 3,136,059 to be employed to enable injection of coolant down shank 36 to head 38 for discharge from passageways 46 onto the tooth surface being abraded. Moreover, this can be accomplished while taking advantage of the extremely high rotational velocities of air turbine handpieces.

Referring now to FIGS. 8-12, the formation of a different type of dental drill by an alternative embodiment of the method of the present invention is illustrated. The dental drill shown in the various stages of formation in FIGS. 8-12 is a parallel drill with a pointed tip, and it has an extremely small diameter for very high-speed work. Thus, the finished diameter of the head portion of this drill is 0.032 inches, which is smaller than the inside diameter of the bore of the tubing initially selected for manufacture of the drill.

Figure 8:
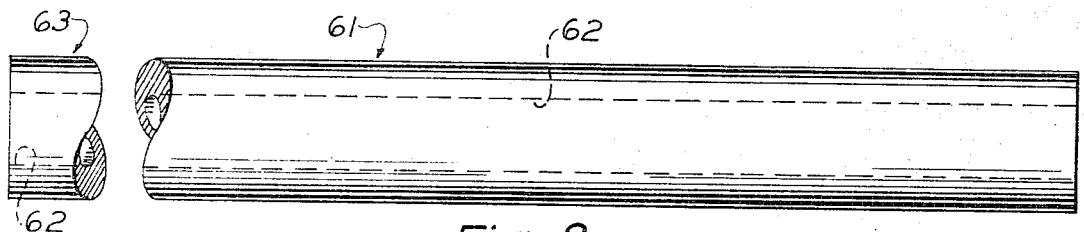
FIG. 8 is a longitudinal elevational view of a piece of tubing for use in the manufacture of a dental drill in accordance with an alternative method of the present invention.

In FIG. 8 tubing 61 is shown cut to the approximate length of the dental drill to be formed. For this drill tubing 61 is selected to have an outside diameter of about 0.065 inches and a bore 62 of 0.033 inches to provide walls of about 0.016 inches in thickness. In order to enhance the symmetry of the drill and improve its dynamic performance, a preliminary step in the manufacture is to centerless grind the entire length of tubing 61. This step eliminates surface irregularities and reduces the wall thickness only about one to two mills. Thus, the shape of the tubing in FIG. 8 would be substantially the same before and after centerless grinding. Shank portion 63 of the centerless ground tube will not be further formed in the manufacture of the drill of FIGS. 8-12, and accordingly, the wall thickness of the shank portion must be initially selected to provide sufficient strength at the shank portion to allow gripping of the drill by the dental handpiece and operation at high speeds. A wall thickness of 0.015 inches is sufficient for this purpose when the drill is formed from a hardened stainless steel material.

Figure 9:
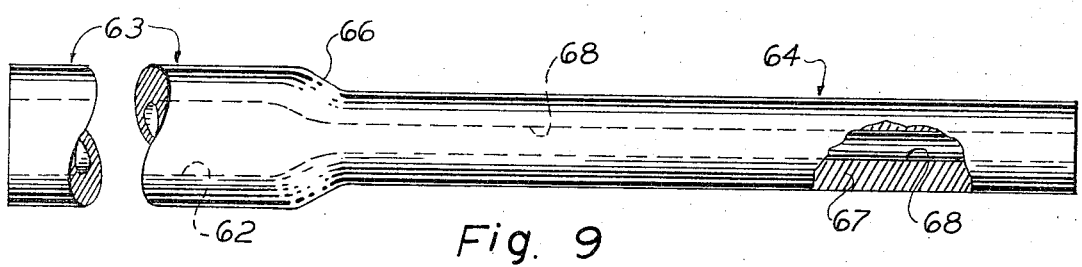
FIG. 9 is a longitudinal elevational view, partially fragmented, of the tubing of FIG. 8 in a further stage of formation.

Since the drill is to be an extremely high-speed drill with a head portion 64 substantially smaller in diameter than shank portion 63, the next step in formation of the dental drill is swage forming head portion 64 to decrease the outside diameter to an intermediate diameter, shown in FIG. 9. Again, dies 11 and 12 in the rotary swaging machine of FIGS. 1 and 2 are preferably substantially cylindrical in form, although they have a tapered entrance section which forms shoulder 66 between the head and shank. As will be seen in FIG. 9, the swage forming step increases the thickness of wall 67 but does not close the bore 68 in head portion 64. In a typical parallel drill with a pointed tip the swaging step reduces the outside diameter of head portion 64 from 0.0625 to about 0.040. If head portion 64 were merely swaged to the desired final diameter, it will be apparent that bore 68 would be closed by the swaging step, and the head portion would become essentially a solid head. If used in this condition, the increase of undesirable mass and inability to inject coolant down the head portion of the drill would frustrate and nullify the method of the present invention. Moreover, closing bore 68 would substantially increase the problems involved in attempting to reopen the bore in a later step, as well as possibly overworking the material.

Figure 10:
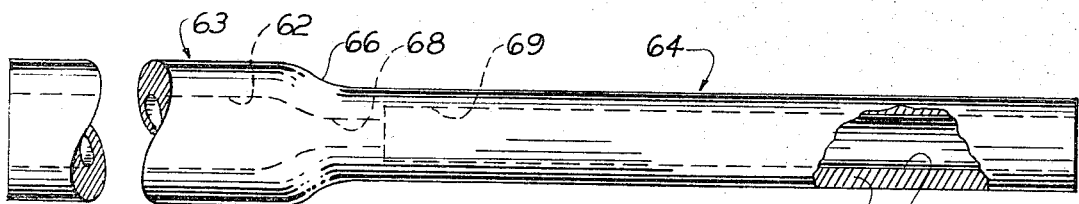
FIG. 10 is a longitudinal elevational view, partially fragmented, of the tubing of FIG. 8 in a further stage of formation.

In order to enable further reduction of head portion 64 while maintaining a bore 68 at a maximum, the next step in the method of the present invention is to counterbore the head to increase the bore to a new diameter, indicated at 69, and reduce the thickness of wall 67, as shown in FIG. 10. In a drill of this type, counterboring usually increases the size of bore 69 to about 0.027 inches, leaving the thickness of wall 67 at about 0.0065 inches.

Figure 11:
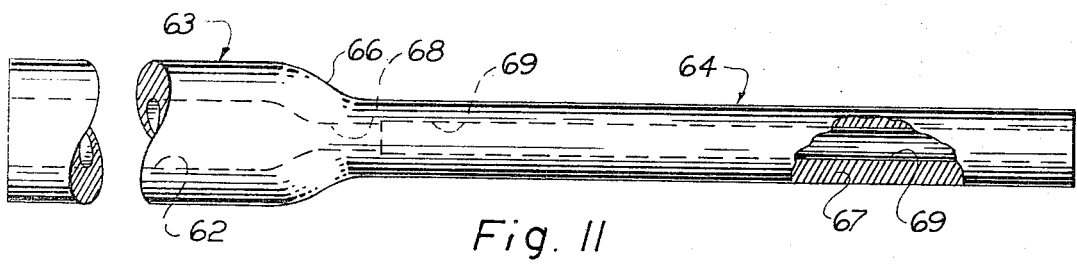
FIG. 11 is a longitudinal elevational view, partially fragmented, of the tubing of FIG. 8 in still a further stage of formation.

Thus, after the wall thickness has been reduced to a degree enabling swage forming without closing the bore in the head, the thickness of wall 67 is increased by a second swage forming step to reduce the outside diameter of the head portion to a finished diameter, shown in FIG. 11. The outside diameter of head portion 64 is now about 0.032 inches or one mil smaller than the inside diameter 62 of shank portion 63. Since the drill is hollow and small in diameter, its extremely low mass allows maximum rotational velocity in the air turbine handpiece. The thickness of wall 67 is now about 0.008 inches, which is sufficient to provide the necessary strength in the head when the stainless steel tubing has been work hardened by the two rotary swaging operations.

Figure 12:
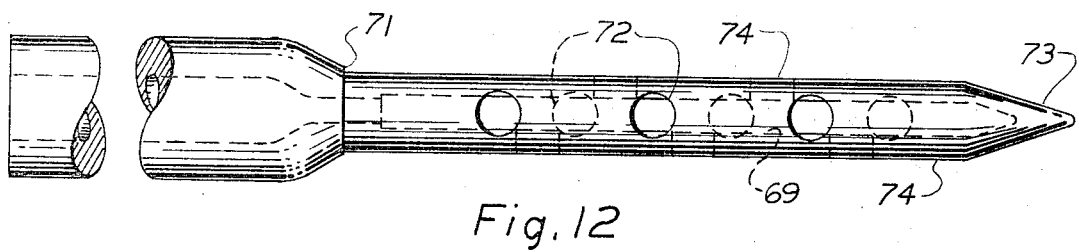
FIG. 12 is a longitudinal elevational view of the final dental drill constructed from the tubing of FIG. 8.

The final form of the parallel drill is seen in FIG. 12 in which a neck portion 71 has been formed as well as a plurality of passageways 72 transverse to bore 69 and an end closure 73. Head portion from neck 71 to closure 73 can then have diamond abrasive material affixed to outer surface 74 thereof.

Still a further alternative embodiment of the manufacturing method of the present invention can be understood by reference to FIGS. 13 and 14. A piece of tubing initially selected to have a diameter equal to shank portion 81 and an internal bore 82 is employed. The reducing step of the wall thickness of head portion 83 is accomplished by machining a portion of the tubing off the exterior surface thereof over the length of head 83. Thus, in FIG. 13, bore 82 will be seen to have a constant diameter over the length of the drill while a step at shoulder 84 appears as a result of machining material off the external diameter of the head portion. With the wall thickness thus reduced, swage forming of head portion 83 can be accomplished without closing bore 82. In FIG. 14, therefore, the drill, which is a tapered dental drill, has been swage formed to a frusto-conical configuration, and bore 82 may be seen to terminate in an opening 86 at distal end 87 of the drill. Again, the thickness of the wall 88 as well as the strength thereof in the head portion 83 has been increased as a result of the swage forming operation to a strength sufficeint to enable rotation of the drill at air turbine angular velocities. As will be understood, the drill of FIG. 14 can be further formed with an end closure or coolant passageways. If the step of reducing the wall thickness of head portion 83 were not undertaken, bore 82 would have an undesirably small cross-section and may be prematurely closed. This might result in a solid tip or end of the drill as well as an overall increase in the mass of the drill, both of which results would substantially decrease performance.

As will be understood, the combination of reducing the wall thickness in a head portion of a piece of tubing prior to swage forming the tubing to form the head can be employed to form dental drills having torpedo, flame, tapered and other shapes. These hollow, lightweight and high-speed drills, in turn, may be highly advantageously employed in the newly evolving air turbine dental handpieces employed throughout the dental profession.

I claim:

1. In a method of manufacturing a lightweight, high-speed dental drill having an integrally formed head portion and shank portion, and including the steps of selecting a piece of metal tubing having predetermined dimensions, and swage forming a first end of said tubing to substantially the desired external configuration of said head portion, the improvement comprising the step of:

reducing the wall thickness of said tubing over substantially the entire length of said head portion prior to said swage forming step, said reducing step being effected in an amount combining with said selecting step to produce a head portion after said swaging step having a mass distribution for maximization of rotational velocities, a central bore in said head portion extending over substantially the entire length thereof, and a wall strength in said head portion sufficient to withstand the high rotational velocities and loading forces during use.

2. A method of manufacturing a dental drill as defined in claim 1 wherein, said head portion is formed during said swage forming step with a frusto-conical surface having the small diameter end thereof proximate the distal end of said head portion and having a wall thickness progressively increasing and a bore diameter progressively decreasing in the direction of said distal end, said bore diameter progressively decreasing toward said distal end at a rate faster than the rate of decrease of the outside diameter of said head portion.

3. A method of manufacturing a dental drill as defined in claim 1 and the step of:

forming at least one passageway terminating in an opening in said head portion, said passageway extending between said bore in said head portion and the exterior surface of said head portion, said reducing step being accomplished to an amount insuring sufficient strength in said head portion after formation of said passageway for high speed rotation and use of said drill.

4. A method of manufacturing a dental drill as defined in claim 1 wherein, said reducing step is accomplished by machining a portion of said tubing from the interior surface thereof to effect the removal of excess tubing mass at larger diameter portions of said head portion and to insure a continuation of said bore at smaller diameter portions of said head portion.

5. A method of manufacturing a dental drill as defined in claim 1 wherein, said reducing step is accomplished by machining a portion of said tubing off the exterior surface thereof, said selecting step being accomplished to insure continuation of said bore at smaller diameter portions of said head portion and said reducing step effecting the removal of excess tubing mass at larger diameter portions of said head portion.

6. A method of manufacturing a dental drill as defined in claim 1 wherein, said metal tubing is selected to have an outside diameter about equal to the largest diameter of said head portion upon completion of said drill and an outside diameter larger than the diameter of said shank portion upon completion of said drill, and the additional steps of:

swage forming the second end of said tubing to reduce the outside diameter thereof over a length of said second end defining said shank portion; and after swage forming said first end of said tubing, closing the end of said head portion to terminate said bore and provide a working surface at the distal end of said drill.

7. A method of manufacturing a dental drill as defined in claim 1 and the steps of:

swage forming said head portion before said reducing step to decrease the outside diameter of said head portion to an intermediate diameter, and wherein, said reducing step is accomplished after said head portion is decreased to said intermediate diameter by center boring said head portion to increase said bore substantially over the length of said head portion, and said swage forming after said reducing step decreases the diameter of said head portion to a finished diameter; and the step of:

thereafter closing the distal end of said head portion to provide a working surface at said distal end.

* * * * *

UNITED STATES PATENT OFFICE
CERTIFICATE OF CORRECTION

PATENT NO. : 3,842,632
DATED : October 22, 1974
INVENTOR(S) : Milton E. Nelson

It is certified that error appears in the above-identified patent and that said Letters Patent are hereby corrected as shown below:

Abstract, line 7, change "is" to ---in---.

Signed and Sealed this fourteenth Day of October 1975

[SEAL]

Attest:

RUTH C. MASON
Attesting Officer

C. MARSHALL DANN
Commissioner of Patents and Trademarks